J. Minter,

Bolt-Heading Machine,

No. 2,093. Reissued Oct. 17, 1865.

Witnesses:
Henry Minter
James G. Arnold

Inventor:
James Minter

N. PETERS, PHOTO-LITHOGRAPHER, WASHINGTON, D. C.

UNITED STATES PATENT OFFICE.

JAMES MINTER, OF WORCESTER, MASSACHUSETTS, ASSIGNOR TO HIMSELF, JONATHAN HOPE, AND ROBERT H. BUTCHER.

IMPROVEMENT IN BOLT-HEADING MACHINES.

Specification forming part of Letters Patent No. 43,521, dated July 12, 1864; Reissue No. 2,093, dated October 17, 1865.

*To all whom it may concern:*

Be it known that I, JAMES MINTER, of Worcester, in the county of Worcester, State of Massachusetts, have invented a new and Improved Bolt-Heading Machine; and I hereby declare that the following is a full, clear, and exact description of the same, reference being had to the accompanying drawings, making part of this specification, in which—

Figure 3:
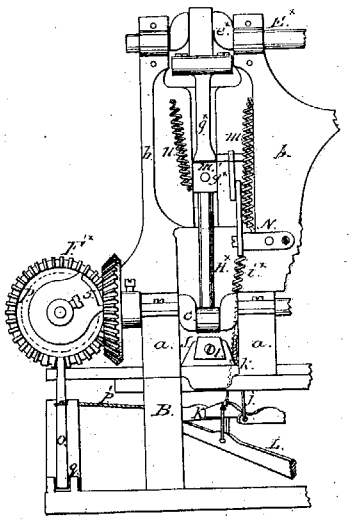
Figure 2:
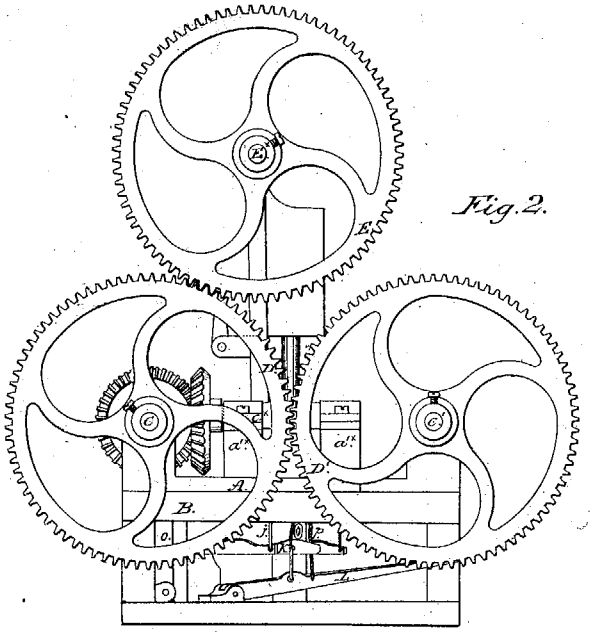
Figure 5:
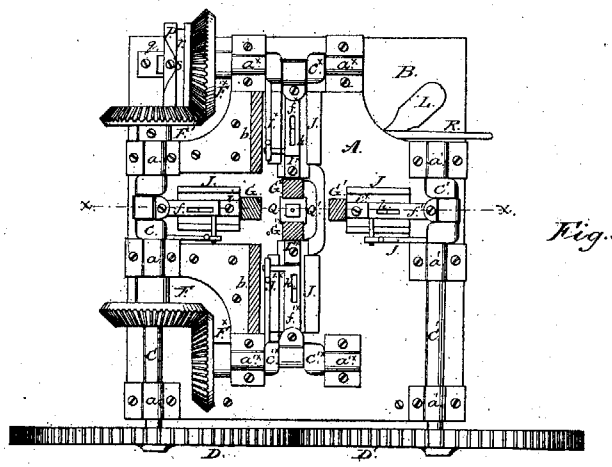
Figure 1:
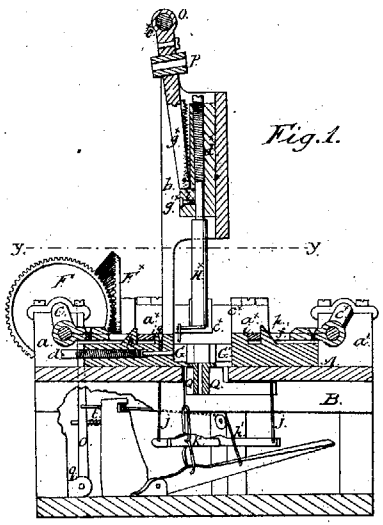
Figure 4:
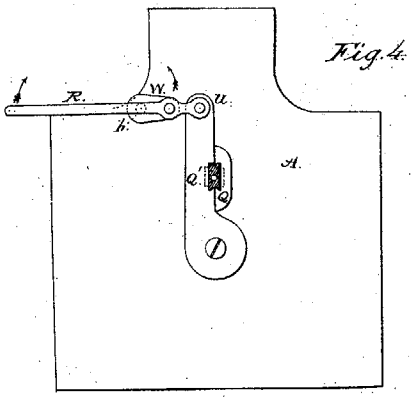

Figure 1 represents a transverse vertical section of my invention, taken in the plane indicated by the line *x x*, Fig. 5. Fig. 2 is a front elevation. Fig. 3 is a side elevation. Fig. 4 is an inverted plan of the jaws for holding the bolt. Fig. 5 is a horizontal section, the plane of section being indicated by the line Y Y, Fig. 1.

Similar letters indicate the same parts in each.

This relates to a machine for heading bolts in which the bolts are held by means of two jaws while exposed to the successive action of a series of formers or dies acting on the top and sides of the head. These dies are adjustable to make heads of different sizes and shapes, and they are operated by hinged spring-dogs, which are connected to a foot-lever in such a manner that by stepping on the same they are thrown into working position, and the head is made and its top and sides smoothed without the necessity of moving it in the jaws. Said foot-lever connects with a guide-lever, the position of which is determined by a groove in the circumference of a revolving drum, in such a manner that it is prevented from throwing the spring-dogs into gear with the dies at the wrong point, and the connection between the foot-lever and the dog acting on the heading die is made by means of a spring rod, and a yielding bolster is inserted between said dog and its crank-shaft in such a manner that in case said die meets with undue resistance it is allowed to yield, and thus prevent injury to the machine.

A represents the bed-plate of my machine, which is secured on a suitable frame or walls and is provided with pillow-blocks *a*, which form the bearings for the driving-shaft C, and this shaft carries the large cog-wheel D, which drives two others of the same size, D′ and E. The wheel D′ is fast on the shaft C′, which has bearings on the plate A. The driving-shaft C has on it two bevel-gears, F F′, which gear into corresponding ones, F* and F′*, on the shafts C* and C′*, which have bearings on the bed-plate and run at right angles to the shafts C C′, as clearly shown in Fig. 5. The wheel E is fast on the shaft E*, which has its bearings in standards rising from the bed-plate A.

The several shafts C C′ C* C′* E* are provided with cranks *c c′ c* c′* e**, which move the dogs *f f′ f* f′* g**, by the action of which motion is given to the dies G G′ G′* G* H*, which dies are inserted in carriages I I′ I* I′*, which move between suitable guideways J, fast to the bed-plate A, and are adjustable by means of the screws *d*, bearing on the ends of the heading tools, and are held in any desired position by the set-screws *g′**, as clearly shown in Fig. 1, where one of the carriages is shown in section. Each of the carriages is provided with a lug passing through the corresponding dog, by which the latter is enabled to draw the carriage back, and with a shoulder, *i*, against which the dog bears to push the carriage forward. The inner ends of the dogs are bent at right angles and project through the slotted arms J J′ J* J′*, which are hinged to the blocks *a a′ a* a′**, and connected by the rods *j* to the piece K, formed somewhat in the shape of the letter H, in order that its extremities may be nearly under the arms, the middle of which is attached to the lever L. Suitable springs, *k*, are placed under the arms to raise them, and with them the dogs, clear of the shoulders, except when the lever is depressed, when the dogs are brought down and give motion to the dies.

The heading-die H* is inserted in a carriage which moves in suitable guideways, attached to the standards *b*, and is adjustable by the screw *d** and set-screw *g′**, similar to the other dies.

The carriage is operated by a dog connected by suitable levers and the spring-rod J′* with the piece K, as clearly shown in Fig. 3. This connection is made yielding to allow the foot-lever to throw in the other dogs independently of this one. When the foot-lever is released the spring *m* acts on the horizontal arm of the elbow-lever N, whose perpendicular arm is connected to the dog $g^*$, and thus throws the dog off the shoulder, and the carriage is raised by the spring $n$. The dog $g^*$ is connected to the crank $e^*$ by a journal-box, $o$, and between this box and the top end of the dog a thick piece, $p$, of elastic material, is inserted, so that in case the heading-die meets undue resistance the dog is allowed to yield, and thus injury to the mechanism is prevented.

The foot lever L is suitably connected to a lever, O, hinged below it, in such position that its end or point stands in front of the cam P on shaft $e^*$, which cam has a groove, $r$, around it, to which the lever has access only through a recess, $s$. A spring, $t$, throws the point of the lever clear of the cam, and when the foot-lever is depressed the lever O strikes the cam and the foot-lever is held from going low enough to set the dogs until the cam turns the recess to the point of the lever, when it can enter the groove $r$, and thus allow the foot-lever to descend, and with it the dogs, thus controlling their action to the proper time.

The bolt to be headed is held by the jaws Q Q′, one of which is stationary while the other is secured to a lever pivoted under the bed plate A and connected by a pivot, $u$, to a hand-lever, R. (See Fig. 4.) This hand-lever has its fulcrum on a pivot, $v$, in the loose end of the arm $w$, which is attached to the bed-plate by the pivot $v'$. By moving the hand-lever in the direction of the arrow in Fig. 4 the swivel-arm turns out in the same general direction and the jaws open. In the position shown in Fig. 4, the swivel-arm is in line with the lever and the jaws are closed. It will be noticed that the lever and arm form a toggle-joint, which forces the jaws together so that they hold the shank of the bolt firmly, and which also prevents their opening until the lever is moved.

In my machine the bolt remains stationary while the heads are formed by the dies, and by these means the jaws are prevented from the constant wear to which they are subjected in others, where the bolt is revolved to present the different sides to the action of the dies.

The principles of operation, it will be seen, consist in upsetting the head by a single die and in acting on two opposite sides of the head at once by two dies, forming a pair, and which are followed by another pair acting on the other sides, while the top is finished by the repeated action of the first die, though for different kinds of work it may be best to vary the order and arrangement of the dies as to increase the number of pairs for a larger number of sides, or to alter their form to correspond to the desired head.

As what is called "a T-head" may be made by setting one pair of dies forward and the others back, and the L-head or one-sided head by setting three up and one back, these and other modifications will readily suggest themselves in adapting the principles of my machine to its work of various kinds.

What I claim as new, and desire to secure by Letters Patent, is—

1. Forming the heads of bolts by the squeezing action of the heading-dies G, G′, G*, and G′*, operating in pairs, substantially as described, in connection with the upsetting-die H, substantially as set forth.

2. The dies G G′ G* G′*, arranged in combination with each other and with their adjusting-screws, substantially as specified so as to be readily adjustable to different sizes and shapes.

3. The spring-dogs $f$ $f'$ $f^*$ $f'^*$, carriages I I′ I* I′*, with their shoulders and dies G G′ G* G′*, in combination with the piece K, or its equivalent, and the foot-lever L, when constructed and operating in the manner and for the purposes described.

4. The combination of the elastic plate $p$ with the dog $g^*$ and heading-die, constructed and operating as set forth.

5. The lever O and cam P, in combination with the foot-lever L and the forming mechanisms, as described, so that said cam shall control the time of action, as set forth.

6. The combination of the hand-lever R, swivel-arm W, and movable jaw Q′, when constructed and operating substantially as specified, and for the purposes set forth.

JAMES MINTER.

Witnesses:

J. MEAD MINTER,
J. HENRY HILL.